Jan. 5, 1932.            C. WAGAR            1,839,718
MOWER GUARD
Filed April 1, 1930         2 Sheets-Sheet 1
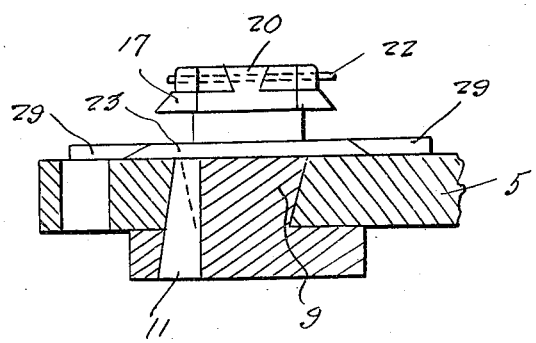
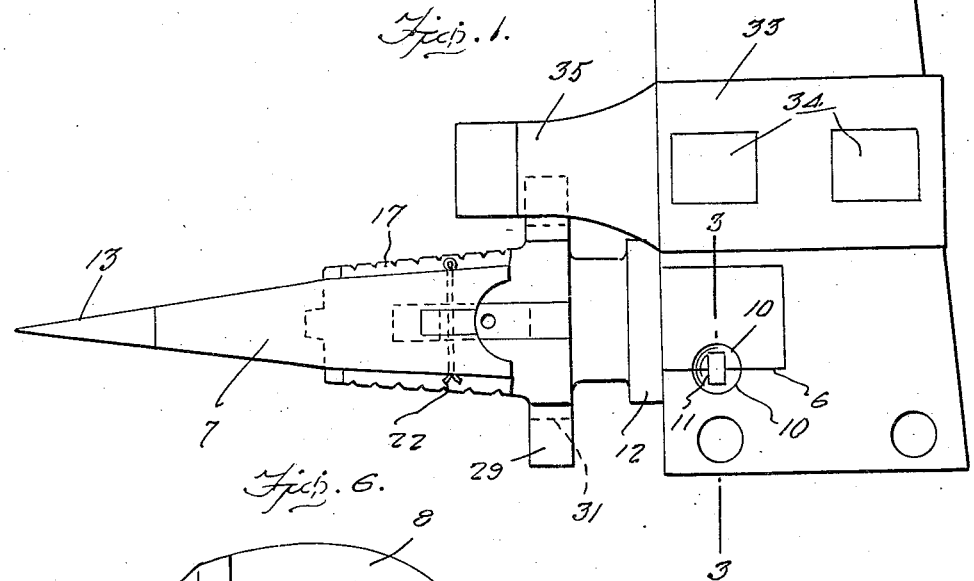
Inventor
C. Wagar
By Clarence A. O'Brien
Attorney Jan. 5, 1932.  C. WAGAR  1,839,718
MOWER GUARD
Filed April 1, 1930  2 Sheets-Sheet 2
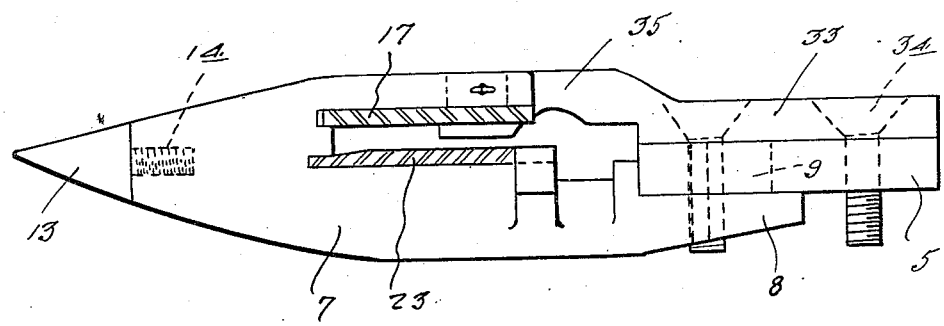
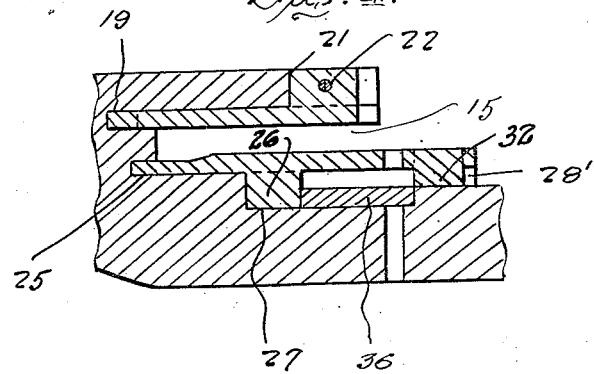
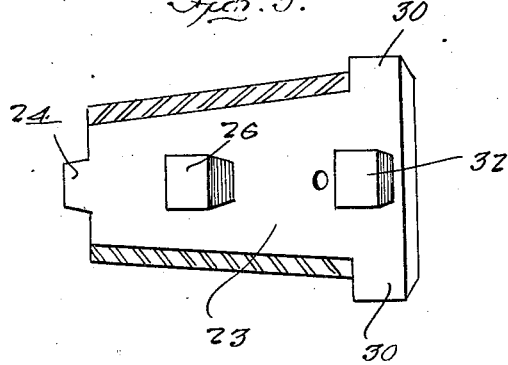
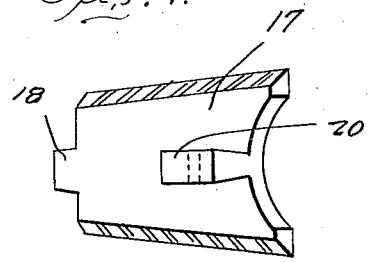
Inventor
C. Wagar
By Clarence A O'Brien
Attorney Patented Jan. 5, 1932

1,839,718

UNITED STATES PATENT OFFICE

CLARENCE WAGAR, OF GLASGOW, MONTANA

MOWER GUARD

Application filed April 1, 1930. Serial No. 440,787.

This invention relates to certain new and novel improvements in a mower guard and the primary object of this invention is to provide a guard finger which can be readily and easily secured to the finger bar of the mower and wherein the guard finger is provided with upper and lower ledger plates detachably secured to the guard finger, and further to provide a guard finger wherein the same at its tapered end is provided with a detachable point.

A still further object of the invention is to provide a mower guard finger which is comparatively simple in construction, thoroughly reliable, practical and efficient in operation and otherwise well adapted for the purpose designed.

Other objects and advantages of the invention will become apparent during a study of the following description taken in connection with the accompanying drawings wherein:

Figure 1 is a top plan view of the improved guard,

Figure 2 is an end elevational view thereof,

Figure 3 is a fragmentary detail sectional view taken substantially on the line 3—3 of Figure 1, Figure 4 is a fragmentary detail sectional view for more clearly illustrating the manner of securing the ledger or cutters to the finger guard, Figure 5 is a bottom plan view of the lower ledger or cutter plate, Figure 6 is a fragmentary detail plan view of the shield of the guard finger, Figure 7 is a top plan view of the upper ledger or cutter plate.

With reference more in detail to the drawings, it will be seen that I have designated generally by the reference character 5 a conventional type of finger bar. The bar 5 is provided with a suitable notch 6 extending inwardly from one longitudinal edge of the finger bar. The guard finger is designated generally by the reference character 7, and as shown the guard finger is of elongated configuration tapering toward its forward end and at its rear end is provided with a heel portion 8 which heel portion 8 has formed integrally therewith an upstanding lug 9 having beveled longitudinal side edges for fitting conformably within the notch 6 of the finger bar 5.

The finger bar 5 at one side of the notch 6, and the lug 9 at one edge thereof is provided with a suitable vertical notch 10 for receiving therein a wedge member 11 to securely retain the lug 9 within said notch 6. Forwardly of the lug 9 the guard finger is provided with a transverse shoulder 12 for abutting the adjacent edge of the finger bar 5.

A detachable point 13 is provided with a rearwardly extending threaded pin threadedly received in the forward end of the guard finger as at 14 as shown to advantage in Figure 2. Forwardly of the shoulder 12 the guard finger 7 is provided with a longitudinally extending notch or recess 15 opening at opposite sides of the guard finger.

Arranged within the recess 15 is a relatively small upper ledger plate 17. The ledger 17 tapers toward its forward end and at its forward end is provided with a tongue 18 receivable in a pocket 19 formed in the guard finger at the inner end of the recess 15.

At its rear end the ledger 17 is provided with an upstanding lug 20 the vertical side edges of which taper toward the bottom of the lug and this lug 20 is receivable conformably in a suitable notch 21 in the top of the guard finger at the opened rear end of the recess 15 as shown to advantage in Figure 4.

A retaining pin 22, which is preferably in the nature of a cotter pin is passed through registering openings formed in said top of the guard finger and in the lug 20. A relatively large ledger plate 23 is disposed in the recess 15 in the bottom of the recess and this ledger 23 tapers toward its forward end to terminate in a tongue 24 receivable in a suitable pocket 25 provided therefor in the guard finger 7.

Depending from the bottom of the lower ledger 23 is a retaining lug 26 receivable in a longitudinal slot 27 formed in the guard finger 7 and extending inwardly of the recess 15 as shown to advantage in Figure 4. The guard finger 7 forwardly of and in spaced relation to the shoulder 12 is provided with a transversely extending shoulder 28 terminating at its opposite end into standing lugs 29 projecting laterally from opposite sides of the guard finger.

The widest rear end of the ledger 23 is adapted to rest on the shoulder 28, and at said end the ledger plate 23 is laterally extended to provide lateral abutments 30, the outer edges of which are suitably beveled for conformable engagement with the beveled inner faces of the lugs 29 as at 31 (see Figure 1).

Remote from the tongue 24, the ledger plate 23 is provided with a lug 32 adapted to be accommodated in a suitable groove 28' provided therefor intermediate the ends of shoulder 28 as suggested in Figure 4. Also there is provided a member or lock 36 fitting within the bottom of the slot 27 between the lug 26 and the shoulder 28 for preventing the ledger plate 23 from moving longitudinally of the recess 15. (See Figure 4.)

There is also provided a suitable clip or guard member designated generally by the reference character 33. The member 33 is adapted to be fixed to the finger bar 5, and the base of the clip member 33 is provided with a pair of openings adapted to register with suitable openings in the finger bar. Retaining bolts 34 extend through the registering openings in the clip 33 and finger bar 5, and the heads of the retaining bolts 34 are countersunk in the base of the member 33 as clearly suggested in Figures 1 and 2.

The clip or guard member 33 further embodies a reduced forwardly extending portion 35 terminating slightly forwardly of the shoulder 28 of the guard finger and disposed above the adjacent lateral lug 29 of the finger as also shown to advantage in Figure 1.

The clip or guard member 33 is disposed laterally with respect to the guard finger or more particularly will be disposed between two adjacent guard fingers, only one of which is shown in the drawings, and the purpose of the guard or clip 33 is to hold the movable cutters (not shown) against raising up and contacting the upper ledger plate 17.

From the foregoing then it will be seen that I have provided a practical guard finger for mowers and that the guard finger may have the upper and lower ledgers placed and readily and easily assembled or disassembled therewith, and that the pointed end of the guard finger in the event of breakage may be readily and easily replaced. Further it will be also seen that the guard finger may be readily and easily, and at the same time rigidly secured to the finger bar.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. In combination, a finger bar having a notch extending inwardly from one edge thereof, a guard finger provided at one end with a heel portion adapted to engage one face of the finger bar, a lug integral with the heel portion and fitting conformably within said notch, and means engageable with said lug and the finger bar for locking the lug within said notch.

2. In combination, a finger bar, a guard finger detachably connected therewith, said guard finger having a recess opening laterally thereof, upper and lower ledger plates arranged in the recess, and each of said ledger plates being provided with a lug engageable with a notch provided therefor on the guard finger.

3. In combination, a finger bar, a guard finger detachably connected therewith and having a longitudinal recess opening laterally thereof and at one end inwardly from the corresponding end of the guard finger, upper and lower ledger plates arranged in said recess and having respectively opposite longitudinal edge portions projecting laterally of the guard finger, said guard finger at the top and bottom of said recess provided with dovetailed notches, dovetail lugs integral with said ledger plates and conformably engaging said notches, and additional means for retaining said ledger plates in position against longitudinal displacement relative to the guard finger.

4. A guard finger provided intermediate its ends with a longitudinally extending recess opening laterally thereof, said recess also opening at one end inwardly from the corresponding end of the guard finger, upper and lower ledger plates arranged in said recess, said guard finger at the top and bottom of said recess provided with notches, lugs integral with the ledger plates and engageable with said notches, means engaging said guard finger and the lug of the upper ledger plate for retaining the latter against longitudinal displacement relative to the guard finger, said guard finger adjacent the open end of said recess being provided with a transverse shoulder having a groove provided intermediate its ends, and a second lug integral with the lower ledger plate and engageable with said groove, and a member interposed between the first lug of said lower ledger plate and said shoulder for retaining said lower ledger plate against longitudinal displacement relative to the guard finger.

5. A guard finger of the character described and provided with a recess intermediate the ends thereof, a ledger plate arranged in said recess, said guard finger adjacent said recess provided with a notch, a lug integral with the ledger plate and engageable with said notch, said guard finger adjacent one end of the recess provided with a transverse shoulder for supporting one end of the ledger plate, lugs integral with said shoulder and engaging adjacent portions of said ledger plate, and a member interposed between said shoulder and the lug of said ledger plate for retaining said lug against longitudinal movement within said notch.

In testimony whereof I affix my signature.

CLARENCE WAGAR.